United States Patent [19]

Broyles

[11] Patent Number: 4,604,158

[45] Date of Patent: Aug. 5, 1986

[54] APPARATUS AND METHOD FOR STORING AND POSITIONING BEAD CORES FOR TIRE BUILDING

[75] Inventor: Henry D. Broyles, Akron, Ohio

[73] Assignee: The Goodyear Tire & Rubber Company, Akron, Ohio

[21] Appl. No.: 697,022

[22] Filed: Jan. 31, 1985

[51] Int. Cl.[4] ............................................. B29D 30/32
[52] U.S. Cl. .................................... 156/403; 156/131
[58] Field of Search ............... 156/403, 422, 131, 132, 156/135

[56] References Cited

U.S. PATENT DOCUMENTS

| | | | |
|---|---|---|---|
| 2,790,481 | 4/1957 | Beckadolph et al. | 156/403 |
| 3,112,237 | 11/1963 | Borglin et al. | 156/403 |
| 3,224,921 | 12/1965 | Frazier | 156/403 |
| 3,310,445 | 3/1967 | Nakane et al. | 156/131 |
| 3,839,115 | 10/1974 | Leblond et al. | 156/131 |
| 4,190,482 | 2/1980 | Yabe | 156/403 |

FOREIGN PATENT DOCUMENTS 256216  11/1969  U.S.S.R. ............................. 156/403

Primary Examiner—Lois E. Boland
Attorney, Agent, or Firm—Frederick K. Lacher; M. W. Goodwin

[57] ABSTRACT

An annular outboard bead core holder (38) and an annular inboard bead core holder (32) are slidably mounted on a beam member (26) which in turn is slidably mounted for movement between a bead core positioning location under an expandable tire buliding drum (12) to a storage position inboard of the drum. The bead core holders (32,38) are positioned at an outboard end of the beam member (26) in the storage position permitting movement of the inboard end to a position under a tire drum drive housing (16).

5 Claims, 7 Drawing Figures

APPARATUS AND METHOD FOR STORING AND POSITIONING BEAD CORES FOR TIRE BUILDING

This invention relates generally to the handling of bead cores prior to and during the building of a tire on an expandable tire building drum.

Heretofore, bead core setters have been proposed which store the bead cores in positions outboard and above the drum. The bead cores are then lowered and moved over the drum for application to the tire casing. It has also been proposed to store the bead cores in a position coaxial and outboard of the tire building drum and then move the bead cores over the drum for application to the tire casing. In these bead setters, both bead core holders must be opened to provide clearance for removal of the holders from the expanded tire building drum and to provide clearance for the removal of the built tire carcass from the drum.

The present invention is directed to an apparatus and a method for storing and positioning the bead cores in which the bead core holders store the bead cores at a position inboard of the tire building drum and a supporting beam is telescoped under the drum drive housing so that there is no interference with the removal of the built tire carcass from the tire building drum. Only the outboard bead core holder must be opened for movement of the holder over the drum to the storage position and for movement of the bead cores to a position between the bead core holders at the inboard end of the tire building drum.

In accordance with one aspect of the invention there is provided an apparatus for storing and positioning annular tire bead cores in the building of a tire on an expandable tire building drum mounted on a generally horizontal drum drive shaft supported at one end by a drum drive housing characterized by:

(a) a beam member slidably mounted for movement between a bead core positioning location under the drum and a storage position at the inboard end of the drum;

(b) an annular outboard bead core holder having an outboard carriage slidably mounted on the beam member for sliding movement between an outboard bead core positioning location and a storage location at the outboard end of the beam member in the storage position;

(c) an annular inboard bead holder slidably mounted on the beam member for sliding movement between an inboard bead core positioning location and a storage location at the outboard end of the beam member in the storage position;

(d) the annular outboard bead core holder having two half sections mounted on the outboard carriage for transverse opening movement to spread the half sections to provide clearance for movement over the drum from the outboard bead core positioning location to the storage position and to permit movement of the bead cores over the drum and through the outboard bead core holder to positions between the inboard and the outboard bead core holders so that the inboard bead core may be placed and held on the inboard bead core holder; and (e) the two half sections of the bead core holder being mounted for transverse closing movement to contract the half sections after the inboard bead core is positioned between the inboard and the outboard bead core holders so that the outboard bead core may be placed and held on the outboard bead core holder.

In accordance with another aspect of the invention there is provided a method of storing and positioning annular tire bead cores in the process of building a tire on an expandable tire building drum mounted on a generally horizontal drum drive shaft supported at one end by a drum drive housing characterized by:

(a) positioning an annular inboard bead core holder and an annular outboard core holder on a beam member in a storage position adjacent an inboard end of the drum with half sections of the outboard bead core holder spread apart to an open position to permit passage of an inboard bead core and an outboard bead core past the outboard bead core holder;

(b) transferring the inboard bead core from a position outboard of the drum, over the drum and to a storage position on the inboard bead core holder;

(c) transferring the outboard bead core from a position outboard of the drum over the drum and to a position between the inboard bead core holder and the outboard bead core holder;

(d) contracting the half sections of the outboard bead core holder and placing the outboard bead core on the outboard bead core holder in a closed position;

(e) moving the beam member in an outboard direction to a centered bead positioning location with the center of the beam member in alignment with a median plane of the drum;

(f) moving the inboard bead core holder and the outboard bead core holder to bead core positioning locations around a tire casing built on the drum;

(g) expanding the drum to urge the tire casing into engagement with the inboard bead core and the outboard bead core;

(h) spreading the half sections of the outboard bead core holder to an open position;

(i) moving the beam member in an inboard direction from the centered bead positioning location to the storage position; and (j) simultaneously moving the inboard bead core holder and the outboard bead core holder on the beam member to positions adjacent an inboard end of the drum.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
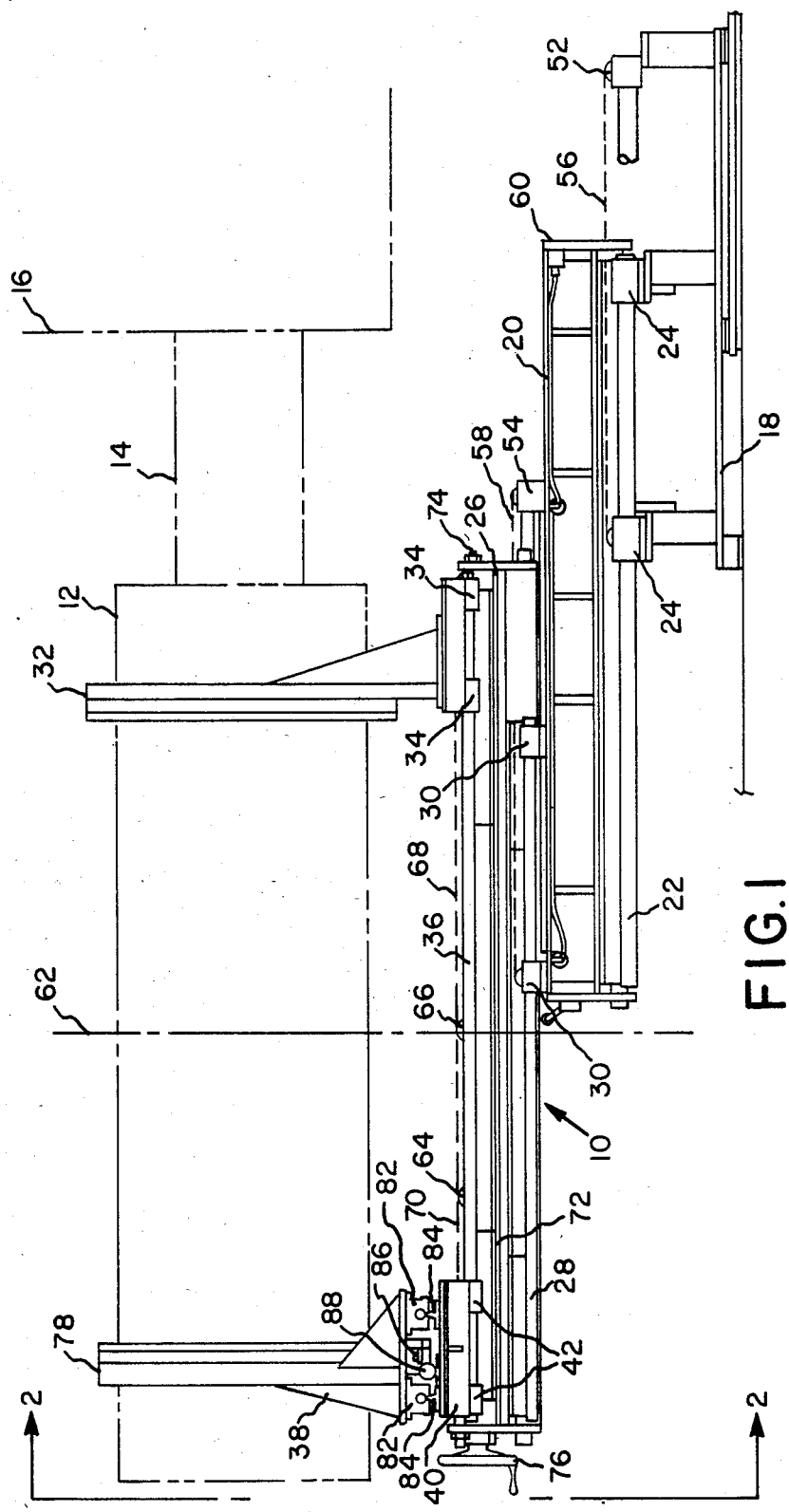
FIG. 1 is a fragmentary side elevation of the apparatus of this invention, showing the bead core holders in position for applying the beads to an expandable tire building drum with the drum, drum drive shaft and drum drive housing being shown in dot-dot-dash lines.
Figure 2:
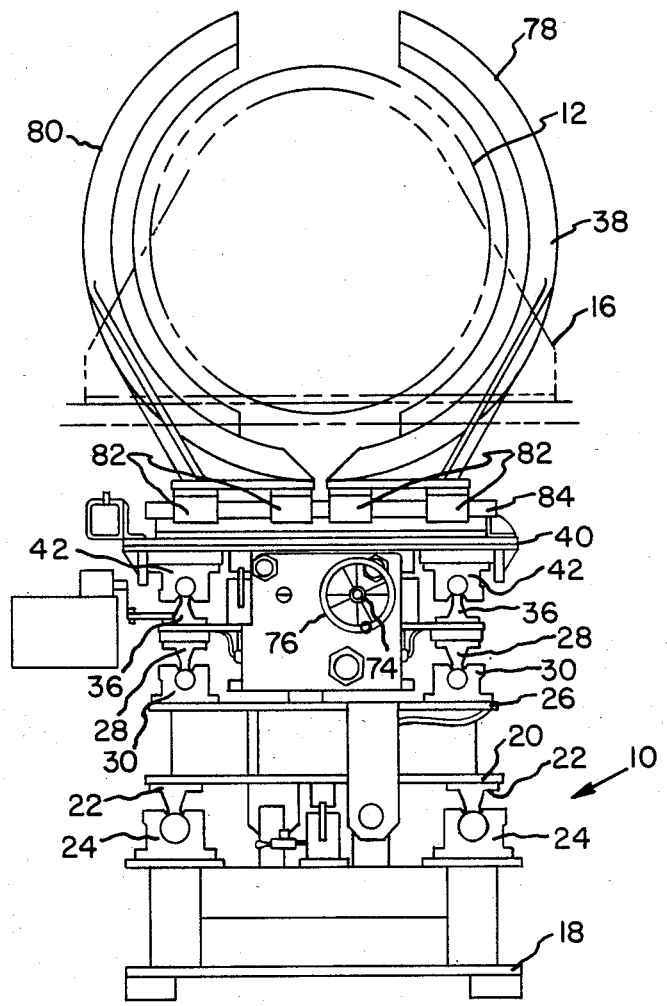
FIG. 2 is an end elevation of the apparatus of FIG. 1 taken along the line 2—2 of FIG. 1.

Referring to FIGS. 1 and 2, a bead setter apparatus 10 embodying the invention is shown for storing and positioning annular tire bead cores on an expandable tire building drum 12 in a bead core positioning location. A drum drive shaft 14 which is generally horizontal and supported at one end by a drum drive housing 16 is connected to the drum 12. A base member such as bead setter base 18 is mounted on a floor or other supporting surface at a position inboard of the drum 12 and under the drum drive shaft 14. The inboard end of the bead setter base 18 may also extend under the drum drive housing 16. A beam extension member such as beam extension 20 is mounted on the bead setter base 18 for sliding movement and may have shift rail assemblies 22 in slidable engagement with ball bushing blocks 24 mounted on the bead setter base. A beam member such as beam 26 is slidably mounted on the beam extension 20 and may have shaft rail assemblies 28 slidably mounted in ball bushing blocks 30 mounted on the beam extension 20.

An annular inboard bead core holder 32 is slidably mounted on the beam 26 and may have ball bushing blocks 34 in sliding engagement with shaft rail assemblies 36 mounted on the beam 26. An annular outboard bead core holder 38 including an outboard carriage 40 is slidably mounted on the beam 26 and the carriage may have ball bushing blocks 42 in sliding engagement with the shaft rail assemblies 36.

Figure 3:
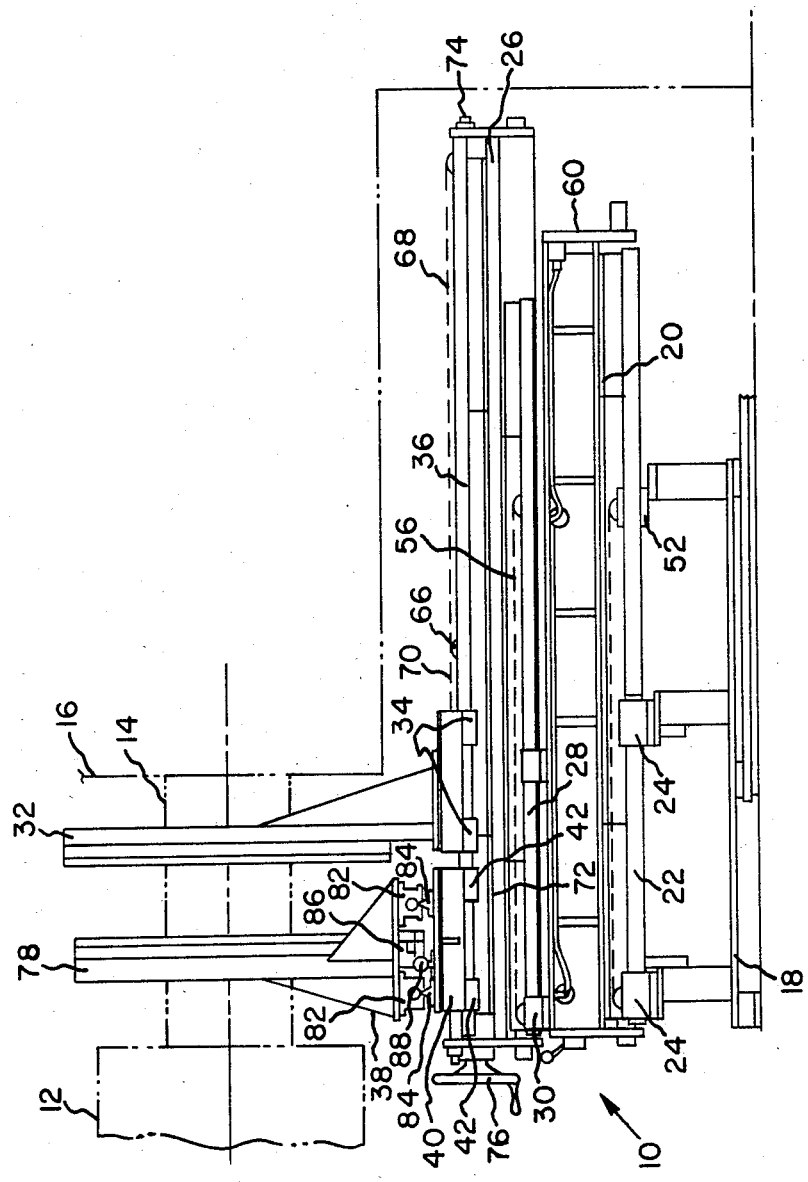
FIG. 3 is a side elevation like FIG. 1 but showing the apparatus with the bead holders in the storage position.

It can therefore be seen that the beam 26 and beam extension 20 may be telescoped from an outboard bead core positioning location, as shown in FIG. 1, to a storage position at the inboard end of the drum 12, as shown in FIG. 3. In the outboard bead core positioning location, the inboard end of the beam 26 and beam extension 20 are positioned under the drum drive housing 16. Suitable means are provided for moving the beam extension 20 relative to the bead setter base 18 and moving the beam 26 relative to the beam extension 20. In the embodiment shown, cable cylinder assemblies are utilized having air cylinders 52 and 54 on the base 18 and beam extension 20, respectively. The air cylinders 52 and 54 have pistons connected to cables 56 and 58, respectively, which are attached to the beam extension 20 and beam 26, respectively. The extent of the travel of the beam 26 and beam extension 20 is determined by stop members such as stop plate 60 and other stop blocks and plates (not shown). Shock absorbers may be used to reduce the forces generated at the stop plates and stop blocks. As shown in FIG. 1, the stop blocks and stop plates are positioned so that in the bead core positioning location the center of the beam 26 is in alignment with a median plane 62 of the drum 12.

The inboard bead core holder 32 and outboard bead core holder 38 which are slidably mounted on the beam 26 are moved along the beam by cable cylinders 64 and 66, respectively. A cable 68 connected to the cable cylinder 64 is fastened to the inboard bead core holder 32 and cable 70 connected to the cable cylinder 66 is fastened to the outboard carriage 40 of the outboard bead core holder 38. The outboard carriage 40 and the inboard bead core holder 32 may be moved on the shaft rail assemblies 36 to the left, as shown in FIG. 3, to an outboard end 72 of the beam 26 in a storage location by actuating the cable cylinder 64 and cable cylinder 66 for movement in one direction. By actuating the cable cylinder 64 and cable cylinder 66 in an opposite direction the outboard carriage 40 and inboard bead core holder 32 may be moved to the right, as shown in FIG. 1, to bead core positioning locations. In this embodiment, this is the same location as the storage location for the outboard bead core holder 38. Furthermore, the inboard bead core holder 32 is moved to an inboard bead core positioning location, as shown in FIG. 1.

The inboard bead core positioning location and the outboard bead core positioning location are determined by adjustable stops threaded on an adjustment screw 74 which may be turned by a hand wheel 76. In this way the bead core positioning locations of the inboard bead core holder 32 and outboard bead core holder 38 relative to the median plane 62 of the drum 16 may be set for different length tire casings.

Slidably mounted on the outboard carriage 40 are two half sections 78 and 80 of the annular outboard bead core holder 38 with each of the half sections having ball bushing blocks 82 in slidable engagement with transverse shaft rail assemblies 84 on the carriage. The half sections 78 and 80 are connected by a suitable movement equalizer such as rack and pinion 86. An air cylinder 88 mounted on the outboard carriage 40 may be connected to one of the racks of the rack and pinion 86 for transverse opening movement to spread the half sections 78 and 80 and for transverse closing movement to contract the half sections.

Figure 4:
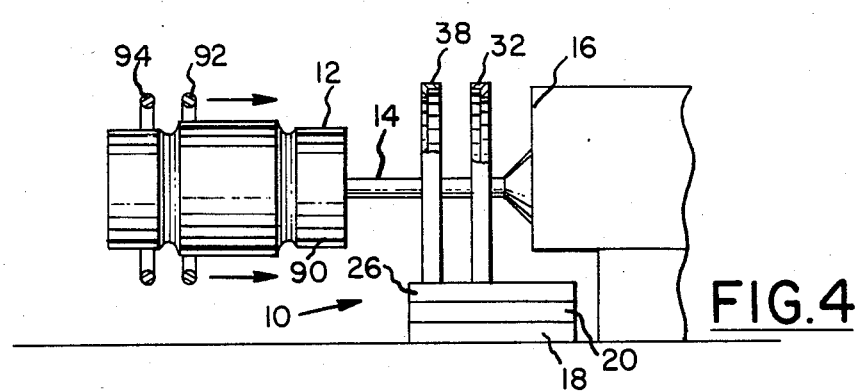
FIGS. 4 through 7 are schematic side elevation views illustrating the operation of the apparatus.

Referring further to FIGS. 4, 5, 6 and 7, the operation of the bead setter apparatus 10 is illustrated. In FIG. 4, the annular inboard bead core holder 32 and the annular outboard bead core holder 38 are positioned on the beam 26 in a storage position adjacent an inboard end 90 of the drum 12. The half sections 78 and 80 are spread apart to an open position, as shown in FIG. 2, to permit transfer of an annular inboard bead core 92 and an annular outboard bead core 94, shown in section, from a position outboard of the drum 12, over the drum and past the outboard bead core holder 38. The inboard bead core 92 is then transferred to a storage position on the inboard bead holder 32. The outboard bead core 94 is transferred to a position between the inboard bead holder 32 and the outboard bead holder 38. At this time, the air cylinder 88 on the outboard carriage 40 is actuated to move the rack and pinion 86 so that the half sections 78 and 80 of the outboard bead core holder 38 are contracted. The outboard bead core 94 may then be placed on the outboard bead core holder 38 in the closed position. The inboard bead core holder 32 and outboard bead core holder 38 may include magnetic rings for holding the metal bead cores 92 and 94 in position on the holders.

Figure 5:
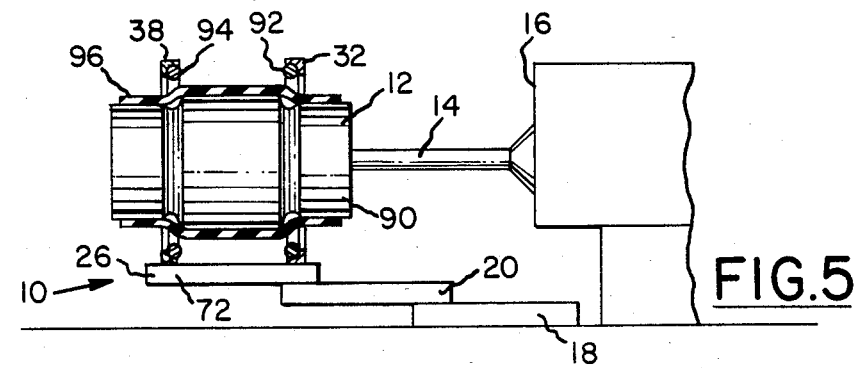
Figure 6:
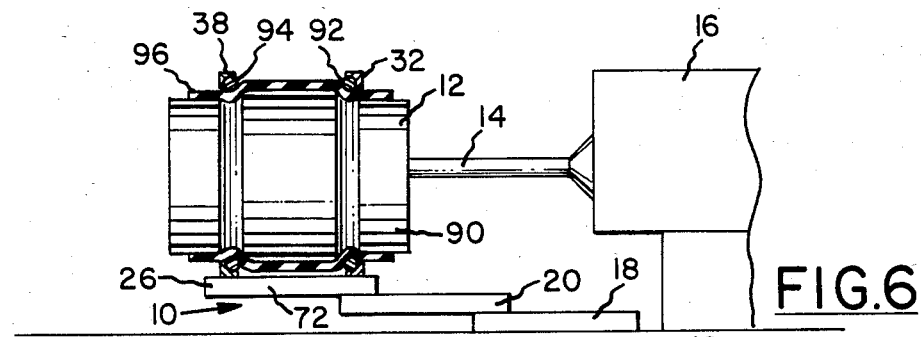

After the inboard bead core 92 and outboard bead core 94 are placed in the storage position the operator may build a tire casing 96, shown in section in FIG. 4, on the expandable drum 12. The beam 26 and beam extension 20 are then moved to the left, as shown in FIG. 5, to the centered bead positioning location, as shown in FIG. 1, by actuating the air cylinders 52 and 54 of the cable cylinders mounted on the base member 18 and beam extension 20. The inboard bead core holder 32 and outboard bead core holder 38, shown in section, are then moved along the beam 26 to the bead core positioning locations around the tire casing 96 by actuating the cable cylinders 64 and 66, as shown in FIG. 5.

The expandable drum 12 may then be expanded to urge the tire casing 96 into engagement with the inboard bead core 92 and outboard bead core 94. The half sections 78 and 80 of the outboard bead core holder 38 may then be spread to an open position by actuating the air cylinder 88.

Figure 7:
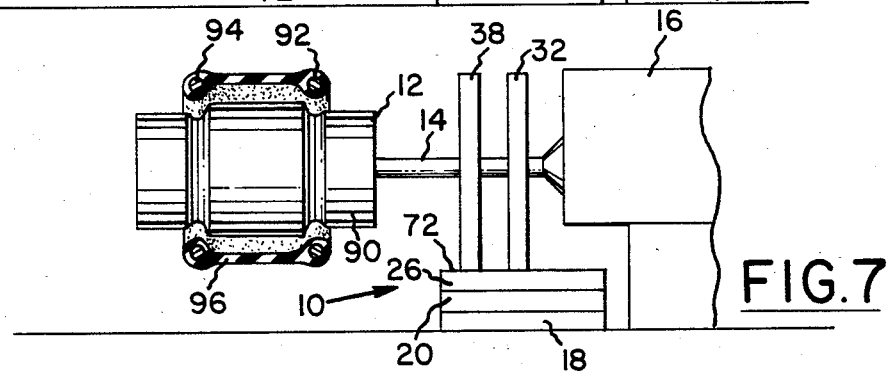

The beam 26 and beam extension 20 may then be moved inboard to the storage position, shown in FIGS. 4 and 7, by actuating the air cylinders 52 and 54. Simultaneously, the inboard bead core holder 32 and outboard core holder 38 are moved along the beam 26 to positions adjacent the inboard end 90 of the drum 12 by actuating the cable cylinders 64 and 66. The edges of the tire casing 96 may then be turned up around the inboard bead 92 and outboard bead 94 to form the tire casing shown in FIG. 7. The expandable drum 12 may then be contracted so that the built tire casing 96 may be pulled off the drum 12. The apparatus 10 is then in condition for transferring another inboard bead core 92 and outboard bead core 94 from a position outboard of the drum 12 to the storage position on the inboard bead core 32 and outboard bead core 38 as described hereinabove.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for storing and positioning annular tire bead cores in the building of a tire on an expandable tire building drum mounted on a generally horizontal drum drive shaft supported at one end by a drum drive housing characterized by:
   (a) a beam member slidably mounted for movement along said tire building drum;
   (b) means for moving said beam member between a bead core positioning location under said drum and a storage position at the inboard end of said drum;
   (c) an annular outboard bead core holder having an outboard carriage slidably mounted on said beam member;
   (d) means for moving said outboard carriage on said beam member between an outboard bead core positioning location on said drum and a storage location at the outboard end of said beam member in said storage position;
   (e) an annular closed inboard bead core holder slidably mounted on said beam member;
   (f) means for moving said inboard bead core holder on said beam member between an inboard bead core positioning location on said drum and a storage location at the outboard end of said beam member in said storage position;
   (g) said annular outboard bead core holder having two half sections mounted on said outboard carriage for transverse opening movement and means for spreading said half sections to provide clearance for movement over the tire on said drum from said outboard bead core positioning location to said storage position whereby after removal of the tire said bead cores may be moved over said drum and through said outboard bead core holder to positions between said inboard and said outboard bead core holders so that said inboard bead core may be placed and held on said inboard bead core holder; and
   (h) said two half sections of said bead core holder being mounted for transverse closing movement and means to contract said half sections after said outboard bead core is positioned between said inboard and said outboard bead core holders so that said outboard bead core may be placed and held on said outboard bead core holder.

2. Apparatus in accordance with claim 1 further characterized by the center of said beam member being in alignment with a median plane of said drum in said bead core positioning location of said beam member.

3. Apparatus in accordance with claim 1 further characterized by said beam member being slidably mounted on a beam extension member and said means for moving said beam member including means for moving said beam member on said beam extension member and means for moving said beam extension member on a base member for carrying said beam member between said bead core positioning location and said storage position.

4. Apparatus in accordance with claim 3 further characterized by said movement of said beam member and said beam extension member being limited by adjustable stop members mounted on said beam member, said beam extension member and said base member.

5. Apparatus in accordance with claim 4 further characterized by said means for moving said beam member and said beam extension member including cable cylinders mounted on said base member and said beam extension member.

* * * * *